US011519378B2

(12) United States Patent
Rothamer

(10) Patent No.: US 11,519,378 B2
(45) Date of Patent: Dec. 6, 2022

(54) INTERNAL COMBUSTION ENGINE WITH LASER-ASSISTED, COMPRESSION IGNITION

(71) Applicant: Wisconsin Alumni Research Foundation, Madison, WI (US)

(72) Inventor: David Rothamer, Madison, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 0 days.

(21) Appl. No.: 17/307,597

(22) Filed: May 4, 2021

(65) Prior Publication Data

US 2021/0363956 A1 Nov. 25, 2021

Related U.S. Application Data

(60) Provisional application No. 63/027,239, filed on May 19, 2020.

(51) Int. Cl.
*F02M 57/06* (2006.01)
*F02P 23/04* (2006.01)
*F02B 23/10* (2006.01)

(52) U.S. Cl.
CPC ............ *F02P 23/04* (2013.01); *F02B 23/101* (2013.01); *F02M 57/06* (2013.01)

(58) Field of Classification Search
CPC ................................ F02M 57/06; F02P 23/04
USPC ...................... 123/143 B, 297, 298
See application file for complete search history.

(56) References Cited

U.S. PATENT DOCUMENTS

| 6,155,504 | A | 12/2000 | Sugimoto et al. | |
| 8,826,876 | B2* | 9/2014 | Gruber | F02P 23/04 123/143 R |
| 9,212,648 | B2* | 12/2015 | Gruber | F02P 23/04 |
| 10,006,433 | B2* | 6/2018 | Kanehara | F02B 19/12 |
| 2006/0243238 | A1* | 11/2006 | Anezaki | F02D 35/023 123/143 B |
| 2006/0260581 | A1* | 11/2006 | Yoshimoto | F02P 23/04 123/143 B |
| 2008/0264371 | A1 | 10/2008 | Taido et al. | |
| 2009/0159031 | A1* | 6/2009 | Gruber | F02M 57/06 123/143 B |
| 2010/0000486 | A1 | 1/2010 | Herden et al. | |
| 2013/0000597 | A1* | 1/2013 | Weinrotter | F02P 13/00 123/253 |
| 2013/0206091 | A1* | 8/2013 | Kanehara | F02P 23/04 123/143 B |
| 2014/0305394 | A1* | 10/2014 | Woerner | F02P 23/04 123/143 B |

(Continued)

FOREIGN PATENT DOCUMENTS

WO 2009116879 A3 9/2009

OTHER PUBLICATIONS

International Search Report for PCT/US2021/031115 dated May 6, 2021.

*Primary Examiner* — Erick R Solis
(74) *Attorney, Agent, or Firm* — Boyle Fredrickson, S.C.

(57) ABSTRACT

A compression ignition engine may operate using autoignition resistant fuels by laser-assisted ignition where a focused laser beam directly heats a spray of fuel proximate to an injector nozzle to promote a lifted flame combustion avoiding knock that could occur with the ignition of premixed fuel.

19 Claims, 3 Drawing Sheets

(56) References Cited

U.S. PATENT DOCUMENTS

2015/0037738 A1\* 2/2015 McAlister ............. F02B 17/005
 431/6
2016/0195057 A1 7/2016 Ginter et al.
2019/0186435 A1\* 6/2019 Lowery .................. F02C 7/266
2021/0079874 A1\* 3/2021 Berger ............... F02M 21/0275

\* cited by examiner

INTERNAL COMBUSTION ENGINE WITH LASER-ASSISTED, COMPRESSION IGNITION

CROSS REFERENCE TO RELATED APPLICATION

This application claims the benefit of U.S. provisional application 63/027,239 filed May 19, 2020 and hereby incorporated by reference

STATEMENT REGARDING FEDERALLY SPONSORED RESEARCH OR DEVELOPMENT

- - -

BACKGROUND OF THE INVENTION

The present invention relates to internal combustion engines and in particular to high compression ratio engines operable with autoignition resistant fuels.

Internal combustion engines include the broad categories of spark ignition (SI) engines, in which premixed fuel and air are ignited with an electrical spark, and compression ignition engines (CI) where high compression ratios produce temperatures and pressures that cause autoignition of introduced fuel.

CI engines can have greater thermodynamic efficiency than SI engines, in part by eliminating intake throttling used in SI engines, and in part by providing high compression/expansion ratios impractical with SI engines because of the risk of autoignition (knock) and/or pre-ignition in the premixed air and fuel of an SI engine. The benefits of CI engines are offset by the need for special fuels that can reliably auto ignite at compression temperatures, for example, fuels having a high cetane number, such as diesel fuel. This fuel requirement makes it difficult to use in CI engines with a wide range of other fuels such as jet fuel, gasoline, ethanol, methanol, and liquefied petroleum gas which could greatly reduce soot emissions and the cost of engine aftertreatment and provide other benefits in terms of availability.

SUMMARY OF THE INVENTION

The present invention provides an engine having laser-assisted compression ignition where fuel is ignited by the combination of localized heating, by a laser combined with the elevated temperatures from high compression. The laser is focused at a point near the fuel injector to ignite that fuel stream during the injection process, ensuring timely ignition of autoignition resistant fuels and avoiding knock that can occur with premixed air and fuel.

Specifically, the invention provides, in one embodiment, an injector assembly having an injector providing a conduit for receiving pressurized fuel leading to a nozzle directing a spray along at least one spray axis and a valve positioned to move between a blocking state blocking fuel passing from the central conduit to the nozzle and unblocking state allowing a flow of the pressurized fuel from the central conduit through the nozzle generating a spray in-cylinder; and a laser positioned with respect to the injector to direct a beam of light to a heating region intersecting the spray to produce ignition temperatures igniting that spray.

It is thus a feature of at least one embodiment of the invention to provide an injector that can allow CI engines to operate on autoignition resistant fuels. The laser controls the ignition of the fuel to be before substantial mixing of fuel and air to provide certain and controlled timing of the ignition.

The heating region may be within 300 injector nozzle hole diameters from an exit point of the spray from the nozzle.

It is thus a feature of at least one embodiment of the invention to minimize laser beam travel through the turbulent air and fuel droplets of the stream prior to heating.

Alternatively, or in addition, the laser may be positioned to heat the spray in the heating region prior to an average equivalence ratio in the cylinder rising above 0.5.

Thus, it is a feature of at least one embodiment of the invention to ignite the fuel before mixing of the air and fuel to a degree such as might allow autoignition.

The laser may provide at least one mJ of laser energy per cylinder for each unblocking of the flow of fuel.

It is thus a feature of at least one embodiment of the invention to permit ignition of fuels in this environment without a spark plug igniter other than the laser.

The injector assembly may be incorporated into an engine using a fuel having a research octane above 50 or cetane number below 35. In addition, or alternatively, the fuel may be selected from the group consisting of gasoline, ethanol, methanol, liquefied petroleum gas, and natural gas.

It is thus a feature of at least one embodiment of the invention to provide a high compression engine that can work with a wide range of fuels.

The injector assembly may locate the heating region to receive spray from the nozzle within twenty crank-angle degrees after moving of the valve to the unblocked state.

It is thus a feature of at least one embodiment of the invention to provide rapid ignition after the initiation of fuel injection to minimize air-fuel mixing before heating.

The injector assembly may further include at least one lens focusing the laser at the heating region.

It is thus a feature of at least one embodiment of the invention to provide a laser intensity that promotes air breakdown into a plasma that can more efficiently transfer laser energy into fuel heating.

The injector valve and lens are held within a common sleeve for installation into a cylinder head of an internal combustion engine.

It is thus a feature of at least one embodiment of the invention to ensure precise alignment of the laser and injection streams through the use of an integrated injector system.

The nozzle may provide multiple sprays along different axes passing outward around and distributed around a central injector axis and wherein the laser provides multiple beams of light each directed to a different heating region intersecting a different spray.

It is thus a feature of at least one embodiment of the invention to permit the simultaneous ignition of multiple injector streams to maximize engine energy efficiency.

The laser may provide a master oscillator producing a laser beam conducted by optical fiber to at least one optical amplifier fixed with respect to the injector.

It is thus a feature of at least one embodiment of the invention to permit the high-energy laser pulse to be generated at the injector for reduced energy transmission loss.

The optical amplifier may provide a laser diode pump.

It is thus a feature of at least one embodiment of the invention to permit generation of the laser pulse using electrical energy that can be readily communicated to the different injectors.

These particular objects and advantages may apply to only some embodiments falling within the claims and thus do not define the scope of the invention.

DETAILED DESCRIPTION OF THE PREFERRED EMBODIMENT

Figure 1:
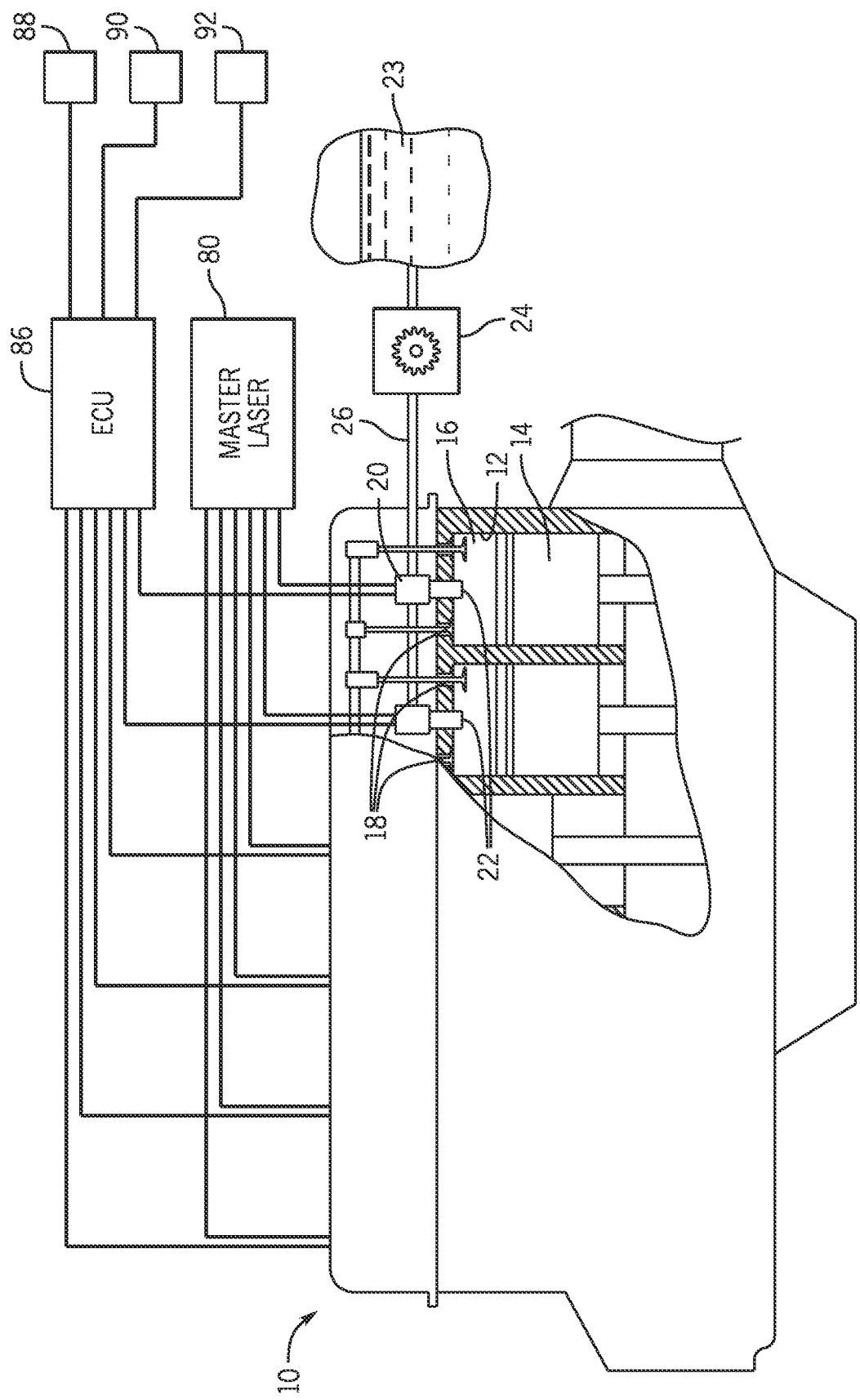
FIG. 1 is a simplified, partial cross-section of a high-compression internal combustion engine providing injectors having laser-assisted ignition.

Referring now to FIG. 1, a high compression internal combustion engine 10, for example, having a compression ratio in excess of 12:1 and as much as 25:1 may provide for multiple cylinders 12 each containing a piston 14 sliding sealingly within the cylinder 12 to compress air within a combustion chamber 16 defined at one end of the cylinder 12. Multiple pistons 14 may be interconnected by a crankshaft to a drive (not shown) per standard engine construction.

The upper wall of the combustion chamber 16 may provide for intake and exhaust valves 18 per conventional methods, to allow fresh air to be drawn into the combustion chamber 16 through the intake valve 18 with the downstroke of the piston 14 and exhaust gases to be removed from the combustion chamber 16 after combustion through the exhaust valve 18. Positioned between the valves 18 is a laser-assisted fuel injector assembly 20 having a nozzle 22 extending into the combustion chamber 16 for injecting and igniting an autoignition resistant fuel 23 such as jet fuel, gasoline, ethanol, methanol, liquefied petroleum gas, or natural gas. The fuel 23 may be pressurized as received from a pump 24 or as received from a pressure regulator for pre-pressurized fuel such as liquefied petroleum gas.

Figure 2:
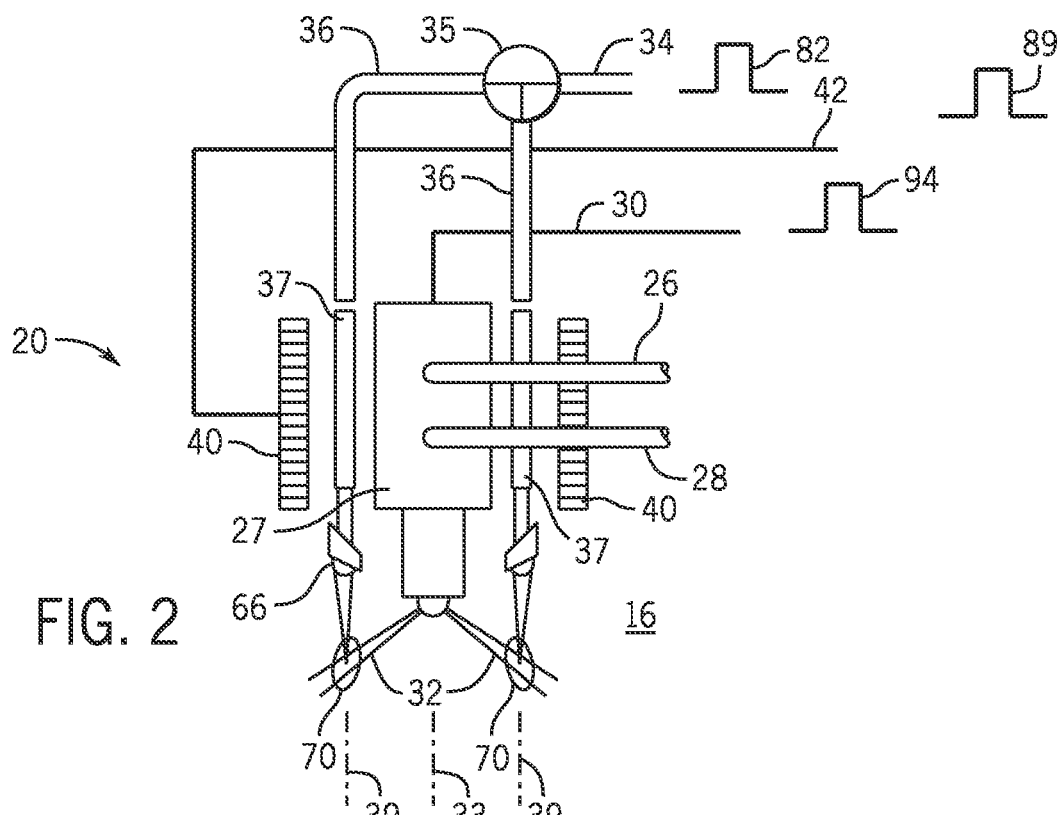
FIG. 2 is a block diagram of an injector of FIG. 1 showing connections to fuel, a master laser, and various electrical signals and showing laser-heated zones adjacent to the injector nozzle.

Referring now also to FIG. 2, each laser-assisted fuel injector assembly 20 may receive fuel 23 through a fuel line 26 connecting to an injector 27 and may conduct excess fuel from the injector 27 through return line 28 to allow fuel to both be injected into the combustion chamber 16 by the injector and to be circulated within the injector assembly 20 for cooling. The injector 27 may be constructed according to well-known techniques for constructing direct injectors for diesel or gasoline engines and may provide either a mechanical injector mechanism or electrical solenoid driven injectors (as shown in FIG. 2) and as are generally understood in the art.

In a solenoid driven injector 27, the injector 27 will receive an electrical injection pulse 84 from electrical conductor 30 causing the injector 27 to open to provide sprays 32 of fuel into the combustion chamber 16. Generally, the sprays 32 will diverge about a central injector axis 33 at regularly spaced equal angles from the central injector axis 33.

The injector assembly 20 may also receive a source of coherent laser light over an optical fiber 34 which may be divided by one or more beam splitters 35 among multiple fibers 36 passing coaxially around the injector 27. The fibers 36 feed light to laser amplifier elements 37, for example, of neodymium-doped yttrium aluminum garnet (Nd: YAG) which will amplify the received laser light into an intense pulse as part of an optical amplifier to be described.

Each laser element 37 is associated with particular ones of the sprays 32, for example, providing a laser element 37 for every other spray 32, thus requiring four laser elements 37 for a typical injector having eight sprays 32. The laser elements 37 may be oriented along axes 39 parallel to axis 33 and arranged at equal angles thereabout to match the angle of the sprays 32. Generally, the focal point of an intense laser pulse from the laser elements 37 will be positioned within a distance equal to the diameter of the orifice 56 times 300 and in some cases within 200 nozzle diameters so that the laser heating area 70 receives the spray 32 while it is still a cohesive stream. In some embodiments, the exit point of window 68 will also preferably be within this distance.

Each laser element 37 may be associated with a laser diode bar 40 of laser diodes directed toward the laser amplifier element 37 to optically pump the laser element 37. The diode laser bars 40 receive power and are controlled by an electrical laser signal 42. Together, the laser elements and laser diode bar 40 provide an optical amplifier that may be pre-charged to amplify a low energy laser pulse received through optical fiber 34. The resulting amplified pulse of laser light will provide at least one mJ of energy per cylinder for each firing.

Figure 5:
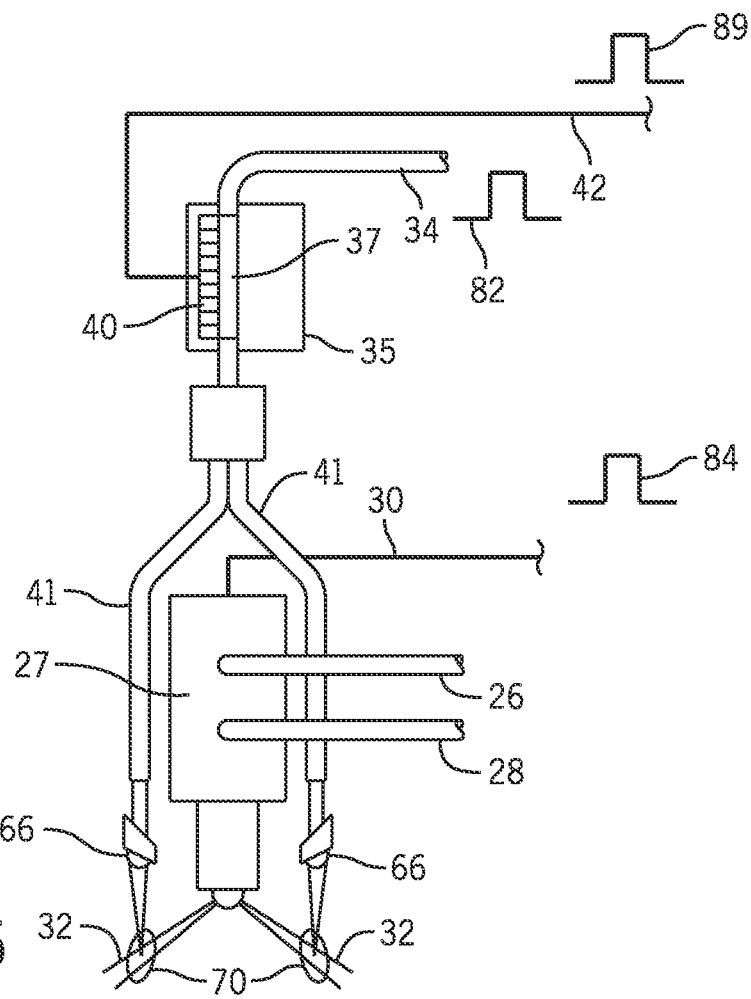
FIG. 5 is a figure similar to FIG. 2 with the master laser displaced from the injector nozzle.

In an alternative embodiment shown in FIG. 5, a laser amplifier located near each injector assembly 20 may also receive a source of coherent laser light over an optical fiber 34. The fiber 34 feeds light to a laser amplifier element 37, for example, of neodymium-doped yttrium aluminum garnet (Nd: YAG) which will amplify the received low energy laser pulse light into an intense pulse as part of an optical amplifier as was described. The output of the laser amplifier 35 is divided by a series of beam splitters into multiple fibers 41 passing coaxially around the injector 27.

Again, each fiber 41 and its corresponding laser beam is associated with a different one of the angularly aligned sprays 32.

Figure 3:
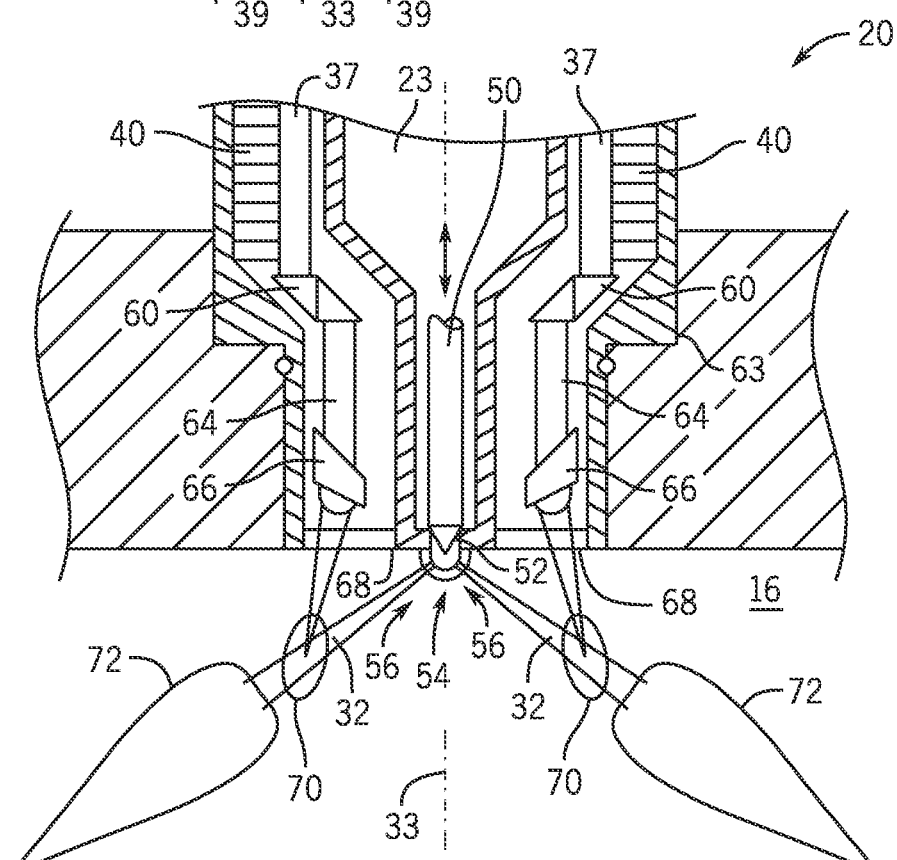
FIG. 3 is a fragmentary, vertical cross-section of the injector of FIG. 2 showing internal optical conduits for conducting and focusing the laser light on sprays from the nozzle.

In both of the examples of FIG. 3 and FIG. 5, elements 37 may be associated with a laser diode bar 40 of laser diodes directed toward the laser element 37 to optically pump the laser element 37. The diode laser bars 40 receive power and are controlled by an electrical laser signal 42. Together, the laser elements and laser diode bar 40 provide an optical amplifier that may be pre-charged to amplify the laser pulse when a laser pulse is received along optical fiber 34. The resulting pulse of laser light will provide at least one mJ per cylinder for each activation of the injector.

Referring now also to FIG. 3, the injector 27 may provide for an internal injector needle 50 normally spring biased downward against a valve seat 52 above a dome-shaped injector nozzle 54. The nozzle 54 may provide orifices 56 each associated with a different spray 32. In this position, the needle 50 seals against the valve seat 52 so that the injector 27 does not produce sprays 32. Operation of an internal solenoid (not shown) lifts the needle 50 to allow the sprays 32 to form from fuel 23. While the invention contemplates operation with a wide variety of different engine sizes and injector designs, generally a typical automotive injector will have orifice diameters of 0.1 mm-0.2 mm while heavy-duty engines will have orifice diameters of 0.25 mm-0.30 mm or larger.

Laser beams from fibers 36 are received by a prism assembly 62 redirecting the laser pulses inwardly toward the axis 33 and then again along the axis 33 at a reduced diameter around the injector 27 consistent with space constraints in the upper wall of the combustion chamber 16. Secondary optical conduits 64 conduct the laser pulses from the prism assembly 62 downward to an integrated prism/lens assembly 66 diverging the laser pulses slightly outward and focusing the laser pulses through sapphire windows 68 directed into the combustion chamber 16 to the heating zones 70.

The thus formed heating zone 70 will be slightly below and outward from the nozzle 54 to intersect the sprays 32. Generally, the heating zones 70 will be close to the nozzle 54 to directly heat the fuel 23 before it has substantially entrained air and before it has reached an overall stochiometric ratio with air for ideal combustion. Ideally, the heating zone 70 is within 300 nozzle orifice diameters of the nozzle 54 or preferably less than 200 nozzle orifice diameters from the nozzle 54. The heated air-fuel mixture 23 will establish to a lifted flame 72 generally slightly downstream from the heated zones 70 and removed from the nozzle 54. The heat generated in the heating zone 70 is sufficient together with the elevated temperature caused by compression of intake air by the pistons 14 to cause ignition of the fuel 23 without the need for a spark plug or other source of energy. While the inventor does not wish to be bound by a particular theory, it is believed that the heating zone 70 as so positioned, provides a non-resonant breakdown of the air-fuel mixture resulting in plasma formation and locally high-temperatures, to ignite the periphery of the spray 32 having some air entrainment, and that this ignition point can then serve to ignite the remainder of the spray as it proceeds from the heating zone 70 forming the lifted flame 72.

In this regard, the timing of the laser pulse will be such that the average equivalence ratio within the combustion chamber 16 is less than 0.5. The equivalence ratio is defined as the ratio of the mass of fuel to mass of oxidizer to the stoichiometric mass of fuel to mass of oxidizer ratio. In some embodiments, the fuel will reach the heating zone 70 within twenty crank angle degrees from a moving of the needle 50 away from the seat 52 to an unblocked state. The close proximity of the zone 70 to the nozzle 54 diminishes air-fuel mixing avoiding the possibility of premature combustion.

Figure 4:
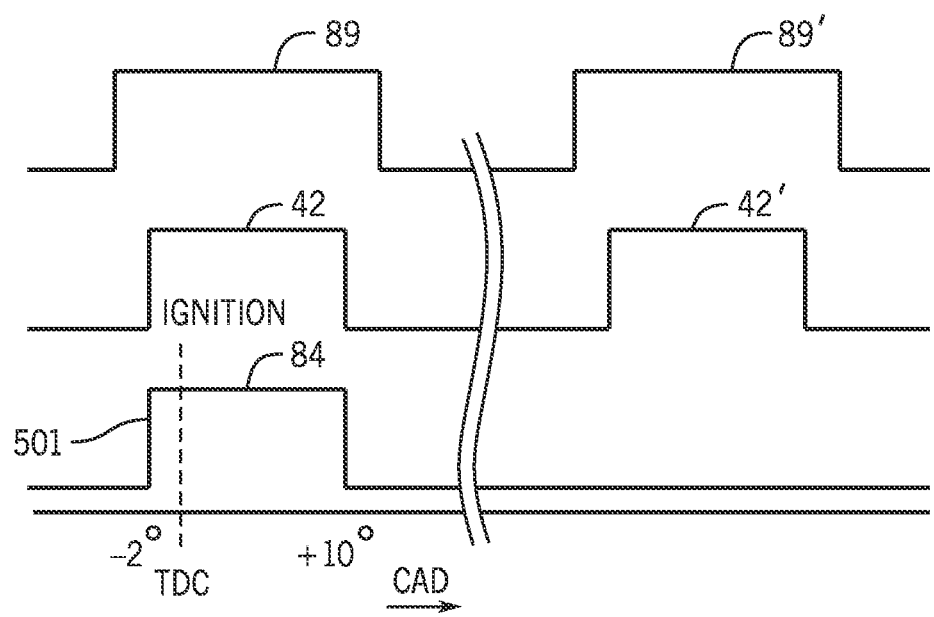
FIG. 4 is a timing diagram showing signals produced by a control module for coordinating the laser and injector.

Referring now again to FIGS. 1, 2, and 4, a master laser 80 provides timed laser signals 82 through fibers 34 timed with injection pulses 84 received by the injector assembly 20 from an electronic control unit (ECU) 86. The master laser 80, for example, may be a Q-switched Nd:YAG laser providing relatively low energy coherent light pulses through the fibers 34. The ECU 86 may have multiple sensors including an intake pressure or mass air/flow sensor, and engine load command sensor (for example from an accelerator pedal or the like) allowing proper control of fuel injection amount and timing as is generally understood in the art. The ECU 86 may also receive signals from various other sensors 92, for example, air temperature, air pressure, exhaust NOx and the like.

In one example, the injection pulse 84 and laser signal 42 may be triggered at a few crank angle degrees (e.g., 2° of the crankshaft) before top dead center and may continue until approximately 100 after top dead center. The optical amplifier signal 89 may turn on slightly before the start of injection (SOI) to precharge the optical amplifier before laser signal 42 and injection pulse 84. Each of the multiple laser diode bars 40 for a given injector assembly 20 will be activated at the same time to prevent a staggered combustion which can reduce efficiency.

The invention allows advancing of the laser signal 42 for additional levels of control subject only to the fact that the spray 32 must have reached the heating zone 70. Feedback control may be used to determine the earliest allowable ignition timing based, for example, based on nitric oxide sensing in the exhaust of the engine. Laser pulse advance would then be controlled in a feedback loop in the ECU 86 to minimize NOx from the next cycle.

Secondary laser pulses indicated by 42' and 89' may be provided after the injection pulse 84 to help clean the sapphire windows 68.

Each of the injector 27, the laser diode bars 40, laser elements 37, beam steering elements 60, lenses 66, and sapphire windows 68 may be contained within a common sleeve 63 for easy installation as a unit and to preserve accurate registration between the laser and the sprays 32.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "controller" and "processor" should be understood to include one or more such devices that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(1) unless the words "means for" or "step for" are explicitly used in the particular claim.

What I claim is:

1. An injector assembly comprising:
   an injector having a conduit for receiving pressurized fuel leading to a nozzle directing a spray of fuel along at least one spray axis and providing a valve positioned to move between a blocking state, blocking fuel passing from the conduit to the nozzle, and an unblocking state allowing a flow of the pressurized fuel from the conduit to the nozzle to exit as the spray;
   a laser positioned with respect to the injector to direct a beam of light to a heating region intersecting the spray to ignite the spray at the heating region; and
   wherein the laser is adapted to ignite the spray in the heating region prior to mixing of the fuel of the spray to an average equivalence ratio of greater than 0.5 in a combustion chamber.

2. The injector assembly of claim 1 wherein the heating region is within 300 nozzle diameters from an exit point of the spray from the nozzle.

3. The injector assembly of claim 1 wherein the laser provides at least one mJ of energy per cylinder for at least one ns during an unblocking of the flow of fuel.

4. The injector assembly of claim 1 further including a fuel selected from the group consisting of jet fuel, gasoline, ethanol, methanol, liquefied petroleum gas, and natural gas ignited within twenty crank-angle degrees of the start of fuel injection in-cylinder.

5. The injector assembly of claim 1 wherein the beam of light produced by the laser is sufficient to ignite the spray of jet fuel, gasoline, ethanol, methanol, and liquefied petroleum gas in an internal combustion engine having a compression ratio of less than 25:1 without an auxiliary spark energy.

6. The injector assembly of claim 1 further including a lens focusing the laser at the heating region.

7. The injector assembly of claim 6 wherein the injector valve and lens are held within a common sleeve for installation into a cylinder head of an internal combustion engine.

8. The injector assembly of claim 1 wherein the nozzle provides multiple sprays along different axes passing outward around from the nozzle and wherein the laser provides multiple beams of light directed to a different heating region intersecting different sprays.

9. The injector assembly of claim 1 wherein the laser provides a master oscillator producing a laser beam conducted by optical fiber to at least one optical amplifier fixed with respect to the injector.

10. The injector assembly of claim 9 wherein the at least one optical amplifier provides a laser diode pump.

11. The internal combustion engine of claim 1 wherein the beam of light from the laser is generated at least in part within 300 nozzle orifice diameters of the nozzle.

12. The injector assembly of claim 1 further including a fuel having at least one of a research octane number rating higher than 50 and cetane number less than 35.

13. An internal combustion engine comprising:
    a set of cylinders and interfitting pistons movable within the cylinders to compress air in a combustion chamber region at an end of each cylinder at a compression ratio of no less than 13:1; and
    an injector assembly communicating with each combustion chamber and including:
    (a) an injector having a conduit for receiving pressurized fuel leading to a nozzle directing a spray of fuel along at least one spray axis and providing a valve positioned to move between a blocking state blocking fuel passing from the conduit to the nozzle and an unblocking state allowing a flow of the pressurized fuel from the conduit to the nozzle to exit as the spray;
    (b) a laser positioned with respect to the injector to direct a beam of light to a heating region intersecting the spray to ignite that spray at the heating region; and
    wherein the laser is adapted to ignite the spray in the heating region prior to mixing of the fuel to above an average equivalence ratio within the cylinder of greater than 0.5.

14. The internal combustion engine of claim 13 further including a fuel having at least one of a research octane number rating of above 50 and cetane number below 35.

15. The internal combustion engine of claim 13 including a fuel selected from the group consisting of: gasoline, ethanol, methanol, liquefied petroleum gas, and natural gas.

16. The internal combustion engine of claim 13 wherein the combustion chamber does not provide a spark plug.

17. The internal combustion engine of claim 13 wherein the laser provides at least one mJ of electrical energy per cylinder for each cylinder firing.

18. The internal combustion engine of claim 13 wherein the laser produces a lifted flame removed from the injector nozzle during the spray.

19. The injector assembly of claim 13 wherein the nozzle provides multiple sprays along different axes passing outward around a central injector axis and wherein the laser provides multiple beams of light directed to a different heating region intersecting different sprays less than a total number of sprays.

* * * * *